United States Patent
Glasco

(10) Patent No.: US 7,249,224 B2
(45) Date of Patent: Jul. 24, 2007

(54) METHODS AND APPARATUS FOR PROVIDING EARLY RESPONSES FROM A REMOTE DATA CACHE

(75) Inventor: David B. Glasco, Austin, TX (US)

(73) Assignee: Newisys, INc., Austin, TX (US)

( * ) Notice: Subject to any disclaimer, the term of this patent is extended or adjusted under 35 U.S.C. 154(b) by 0 days.

(21) Appl. No.: 10/635,703

(22) Filed: Aug. 5, 2003

(65) Prior Publication Data

US 2005/0033924 A1   Feb. 10, 2005

(51) Int. Cl.
G06F 12/00 (2006.01)
G06F 15/167 (2006.01)

(52) U.S. Cl. .................... 711/141; 711/130; 709/217

(58) Field of Classification Search ............ 711/130, 711/118, 126
See application file for complete search history.

(56) References Cited

U.S. PATENT DOCUMENTS

| | | | |
|---|---|---|---|
| 5,524,212 A | 6/1996 | Somani et al. | 711/121 |
| 5,751,995 A | 5/1998 | Sarangdhar | 711/145 |
| 5,893,151 A | 4/1999 | Merchant | 711/140 |
| 6,014,709 A | 1/2000 | Gulick et al. | 709/235 |
| 6,052,769 A | 4/2000 | Huff et al. | 712/3 |
| 6,085,295 A | 7/2000 | Ekanadham et al. | |
| 6,108,737 A * | 8/2000 | Sharma et al. | 710/107 |
| 6,122,715 A | 9/2000 | Palanca et al. | 712/154 |
| 6,167,492 A | 12/2000 | Keller et al. | 711/154 |
| 6,173,393 B1 | 1/2001 | Palanca et al. | 712/224 |
| 6,189,078 B1 * | 2/2001 | Bauman et al. | 711/156 |
| 6,205,520 B1 | 3/2001 | Palanca et al. | 711/138 |
| 6,253,292 B1 * | 6/2001 | Jhang et al. | 711/146 |
| 6,343,347 B1 | 1/2002 | Arimilli et al. | 711/143 |
| 6,385,705 B1 | 5/2002 | Keller et al. | 711/154 |
| 6,490,661 B1 * | 12/2002 | Keller et al. | 711/150 |
| 6,636,906 B1 | 10/2003 | Sharma et al. | 710/22 |
| 6,640,287 B2 | 10/2003 | Gharachorloo et al. | 711/141 |
| 6,658,526 B2 | 12/2003 | Nguyen et al. | 711/111 |
| 6,665,767 B1 | 12/2003 | Comisky et al. | 711/3 |
| 6,728,841 B2 * | 4/2004 | Keller | 711/146 |
| 6,751,721 B1 * | 6/2004 | Webb et al. | 712/10 |
| 6,799,252 B1 | 9/2004 | Bauman | 711/149 |
| 6,973,543 B1 * | 12/2005 | Hughes | 711/141 |
| 2001/0013089 A1 * | 8/2001 | Weber | 711/146 |
| 2002/0046327 A1 | 4/2002 | Gharachorloo et al. | |
| 2002/0053004 A1 * | 5/2002 | Pong | 711/119 |
| 2002/0087807 A1 | 7/2002 | Gharachorloo | 711/141 |
| 2004/0039880 A1 * | 2/2004 | Pentkovski et al. | 711/146 |
| 2004/0088492 A1 | 5/2004 | Glasco et al. | |
| 2004/0088494 A1 | 5/2004 | Glasco | 711/141 |
| 2004/0111566 A1 * | 6/2004 | Edirisooriya et al. | 711/146 |
| 2004/0117554 A1 * | 6/2004 | Raghavan | 711/118 |

(Continued)

OTHER PUBLICATIONS

*HyperTransport™ I/O Link Specification Revision 1.03*, HyperTransport™ Consortium, Oct. 10, 2001, Copyright © 2001 HyperTransport Technology Consortium.

(Continued)

*Primary Examiner*—Matthew Kim
*Assistant Examiner*—Shane M. Thomas
(74) *Attorney, Agent, or Firm*—Beyer Weaver, LLP

(57) ABSTRACT

According to the present invention, methods and apparatus are provided for increasing the efficiency of data access in a multiple processor, multiple cluster system. Mechanisms for allowing a variety of transactions to complete locally are implemented by providing remote data caches associated with the various clusters in the system. The remote data caches receive data and state information for memory lines held in remote clusters. If information for responding to a request is available in a remote data cache, a response with a completion indicator is provided to the requesting processor. The completion indicator allows the request to be met without having to probe local or remote nodes.

20 Claims, 12 Drawing Sheets

U.S. PATENT DOCUMENTS

2004/0117559 A1    6/2004    Glasco et al. ............... 711/141
2004/0123047 A1*   6/2004    Hum et al. ................. 711/141
2004/0236912 A1    11/2004   Glasco et al.

OTHER PUBLICATIONS

Bilir et al., "Multicast Snooping, a New Coherence Method Using a Multicast Address Network," Proceedings of the 26th Int'l Symposium on May 2-4, 1999 http://www.cs.wise.edu/multifacet/papers/isca99_multicast.pdf.

Martin et al., "Bandwidth Adaptive Snooping" Proceedings of the Eight International Symposium on High-Performance Computer Architecture (HPCA"02) 1503-0897/02, IEEE.

Sorin et al, "Specifying and Verfiying a Broadcast and a multicast Snooping Cache'Coherence Protocol"1045-9219/02, IEEE.

International Search Report dated Dec. 3, 2004 from related International Application No. PCT/US03/34756.

U.S. Office Action mailed May 12, 2005, from related U.S. Appl. No. 10/288,347.

* cited by examiner

Figure 7

| Coherence Directory 701 ||||
| --- | --- | --- | --- |
| Memory Line 711 | State 713 | Dirty Data Owner 715 | Occupancy Vector 717 |
| Address 721 | Invalid | N/A | N/A |
| Address 731 | Invalid | N/A | N/A |
| Address 741 | Shared | N/A | Clusters 1,3 |
| Address 751 | Shared | N/A | Clusters 1, 2, 3, 4 |
| Address 761 | Owned | Cluster 4 | Cluster 2, 3, 4 |
| Address 771 | Owned | Cluster 2 | Cluster 2, 4 |
| Address 781 | Modified | Cluster 2 | N/A |
| Address 791 | Modified | Cluster 3 | N/A |
| ... | ... | ... | ... |

Figure 8

| Remote Data Cache 801 | | |
|---|---|---|
| Memory Line 811 | State 813 | Cached Data 815 |
| Address 821 | Invalid | N/A |
| Address 831 | Pending | Data 833 |
| Address 841 | Shared | Data 843 |
| Address 851 | Shared | Data 853 |
| Address 861 | Owned | Data 863 |
| Address 871 | Owned | Data 873 |
| Address 881 | Pending | Data 883 |
| Address 891 | Shared | Data 893 |
| ... | ... | ... |

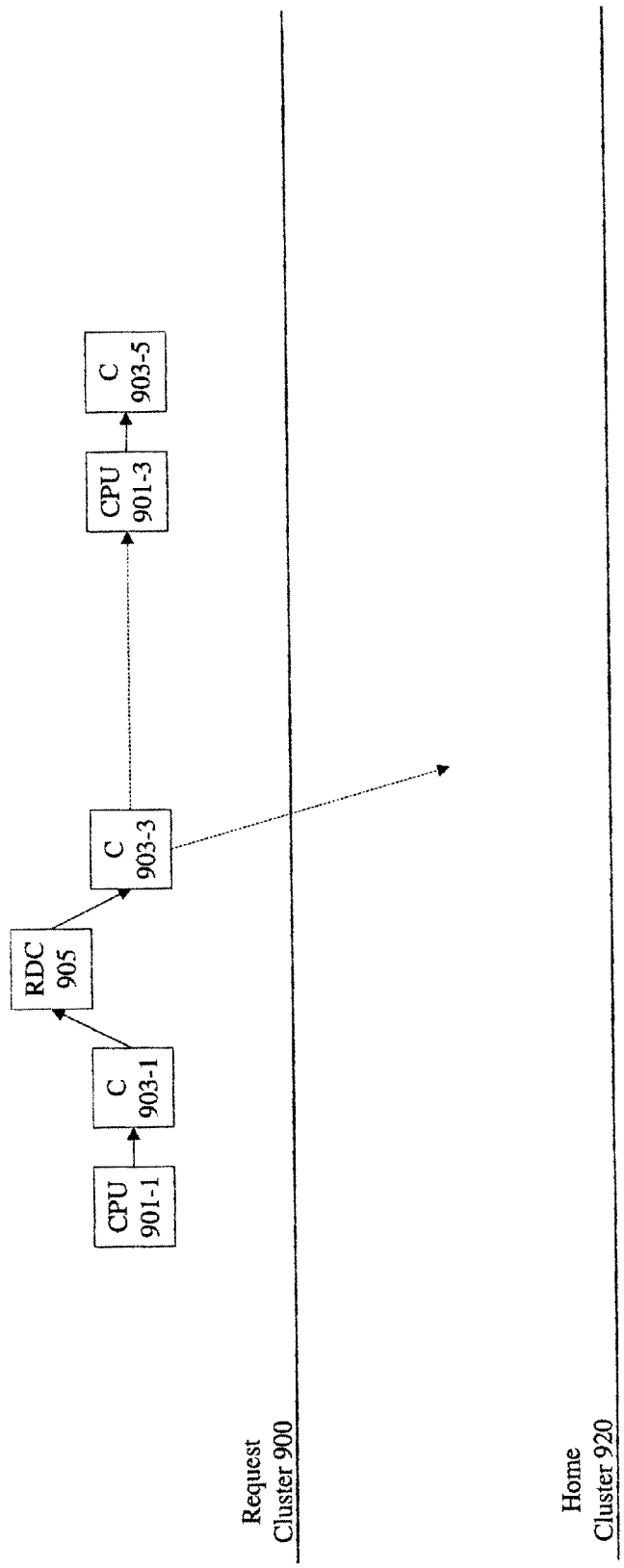

METHODS AND APPARATUS FOR PROVIDING EARLY RESPONSES FROM A REMOTE DATA CACHE

CROSS-REFERENCE TO RELATED APPLICATIONS

The present application is related to filed U.S. patent application Ser. Nos. 10/288,347 and 10/288,399, both titled Methods And Apparatus For Managing Probe Requests by David B. Glasco and filed on Nov. 4, 2002, the entireties of which are incorporated by reference herein for all purposes. The present application is also related to filed U.S. patent application Ser. No. 10/442,845, titled Methods And Apparatus For Providing Cache State Information by David B. Glasco, filed on May 20, 2003, the entirety of which is incorporated by reference herein for all purposes.

BACKGROUND OF THE INVENTION

1. Field of the Invention

The present invention generally relates to accessing data in a multiple processor system. More specifically, the present invention provides techniques for improving data access efficiency while maintaining cache coherency in a multiple processor system having a multiple cluster architecture.

2. Description of Related Art

Performance limitations have led to the development of a point-to-point architecture for connecting processors in a system with a single memory space. In one example, individual processors can be directly connected to each other through a plurality of point-to-point links to form a cluster of processors. Separate clusters of processors can also be connected. The point-to-point links significantly increase the bandwidth for coprocessing and multiprocessing functions.

Mechanisms are provided in each cluster to allow reduction in the number of transactions within and between clusters in a computer system. However, in many instances, the mechanisms do not optimally reduce the number of transactions. In a multiple processor, multiple cluster system, processors send probe requests in order to perform operations on particular memory lines that may be cached in local or remote nodes. Some common operations include read block, read block shared, and read block modified operations on memory lines. In many examples, transactions are forwarded to remote clusters even when transactions could be handled locally if additional mechanisms were provided. However, mechanisms for handling transactions locally are limited.

Consequently, it is desirable to provide techniques for improving cache access request efficiency in systems having multiple clusters of multiple processors connected using point-to-point links.

SUMMARY OF THE INVENTION

According to the present invention, methods and apparatus are provided for increasing the efficiency of data access in a multiple processor, multiple cluster system. Mechanisms for allowing a variety of transactions to complete locally are implemented by providing remote data caches associated with the various clusters in the system. The remote data caches receive data and state information for memory lines held in remote clusters. If information for responding to a request is available in a remote data cache, a response with a completion indicator is provided to the requesting processor. The completion indicator allows the request to be met without having to probe local or remote nodes.

In one embodiment, a method for providing a response to a cache access request is provided. A cache access request associated with a memory line is received at a cache coherence controller from a processor in a cluster of processors, the cluster of processors interconnected in a point-to-point architecture. Response information for the cache access request is obtained from a remote data cache associated with the cache coherence controller. Response information is provided with a completion indicator to the processor.

In another embodiment, a processing cluster is provided. The processing cluster includes a plurality of processors and a cache coherence controller. The plurality of processors are interconnected in a point-to-point architecture. The cache coherence controller is configured to receive a cache access request associated with a memory line from a first processor amongst the plurality of processors, obtain response information for the cache access request from a remote data cache associated with the cache coherence controller and provide response information with a completion indicator to the processor.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 7 is a diagrammatic representation showing a cache coherence directory.

FIG. 8 is a diagrammatic representation showing a remote data cache.

FIG. 9 is a diagrammatic representation depicting a transaction flow using a remote data cache.

DETAILED DESCRIPTION OF SPECIFIC EMBODIMENTS

Figure 1A:
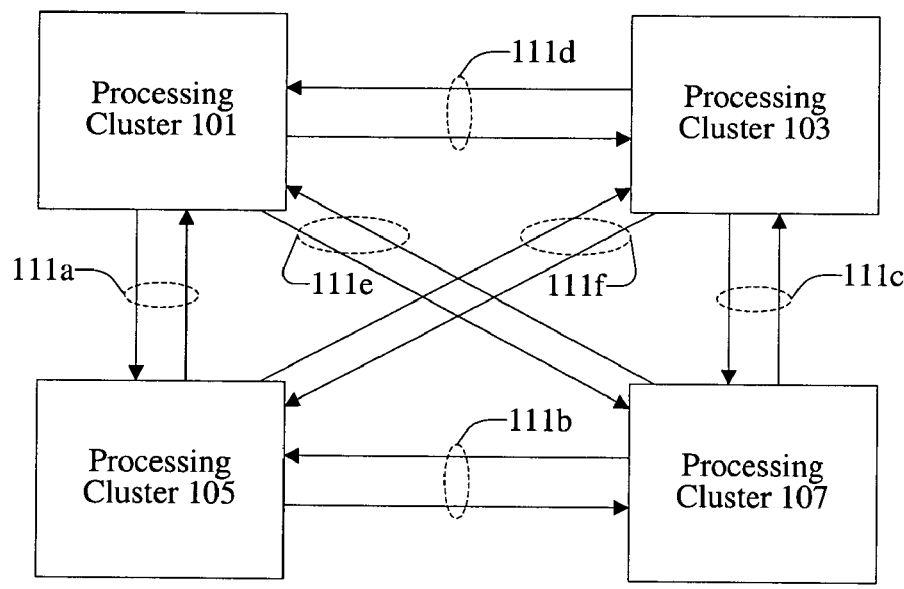
FIG. 1A and 1B are diagrammatic representation depicting a system having multiple clusters.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multi-processor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well-known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Techniques are provided for increasing data access efficiency in a multiple processor, multiple cluster system. In a point-to-point architecture, a cluster of processors includes multiple processors directly connected to each other through point-to-point links. By using point-to-point links instead of a conventional shared bus or external network, multiple processors are used efficiently in a system sharing the same memory space. Processing and network efficiency are also improved by avoiding many of the bandwidth and latency limitations of conventional bus and external network based multiprocessor architectures. According to various embodiments, however, linearly increasing the number of processors in a point-to-point architecture leads to an exponential increase in the number of links used to connect the multiple processors. In order to reduce the number of links used and to further modularize a multiprocessor system using a point-to-point architecture, multiple clusters are used.

According to various embodiments, the multiple processor clusters are interconnected using a point-to-point architecture. Each cluster of processors includes a cache coherence controller used to handle communications between clusters. In one embodiment, the point-to-point architecture used to connect processors are used to connect clusters as well.

By using a cache coherence controller, multiple cluster systems can be built using processors that may not necessarily support multiple clusters. Such a multiple cluster system can be built by using a cache coherence controller to represent non-local nodes in local transactions so that local nodes do not need to be aware of the existence of nodes outside of the local cluster. More detail on the cache coherence controller will be provided below.

In a single cluster system, cache coherency can be maintained by sending all data access requests through a serialization point. Any mechanism for ordering data access requests is referred to herein as a serialization point. One example of a serialization point is a memory controller. Various processors in the single cluster system send data access requests to the memory controller. In one example, the memory controller is configured to serialize or lock the data access requests so that only one data access request for a given memory line is allowed at any particular time. If another processor attempts to access the same memory line, the data access attempt is blocked until the memory line is unlocked. The memory controller allows cache coherency to be maintained in a multiple processor, single cluster system.

A serialization point can also be used in a multiple processor, multiple cluster system where the processors in the various clusters share a single address space. By using a single address space, internal point-to-point links can be used to significantly improve intercluster communication over traditional external network based multiple cluster systems. Various processors in various clusters send data access requests to a memory controller associated with a particular cluster such as a home cluster. The memory controller can similarly serialize all data requests from the different clusters. However, a serialization point in a multiple processor, multiple cluster system may not be as efficient as a serialization point in a multiple processor, single cluster system. That is, delay resulting from factors such as latency from transmitting between clusters can adversely affect the response times for various data access requests. It should be noted that delay also results from the use of probes in a multiple processor environment.

Although delay in intercluster transactions in an architecture using a shared memory space is significantly less than the delay in conventional message passing environments using external networks such as Ethernet or Token Ring, even minimal delay is a significant factor. In some applications, there may be millions of data access requests from a processor in a fraction of a second. Any delay can adversely impact processor performance.

According to various embodiments, probe management is used to increase the efficiency of accessing data in a multiple processor, multiple cluster system. A mechanism for eliciting a response from a node to maintain cache coherency in a system is referred to herein as a probe. In one example, a mechanism for snooping a cache is referred to as a probe. A response to a probe can be directed to the source or target of the initiating request. Any mechanism for filtering or reducing the number of probes and probe requests transmitted to various nodes is referred to herein as managing probes. In one example, managing probe entails characterizing a probe request to determine if a probe can be transmitted to a reduced number of entities.

In typical implementations, requests are sent to a memory controller that broadcasts probes to various nodes in a system. In such a system, no knowledge of the cache line state is known. All nodes in the system are probed and the request cluster receives a response from each node. In a system with a coherence directory, state information associated with various memory lines can be used to reduce the number of transactions. Any mechanism for maintaining state information associated with various memory lines is referred to herein as a coherence directory. A coherence directory typically includes information for memory lines in a local cluster that are cached in a remote cluster. According to various embodiments, a coherence directory is used to reduce the number of probes to remote clusters by inferring the state of local caches. In other embodiments, a coherence directory is used to eliminate the transmission of a request to a memory controller in a home cluster.

According to various embodiments, another level of caching is provided in each cluster so that if the cache associated with each processor does not hold a requested memory line, the cache associated with the cluster may be checked before forwarding a probe to a home cluster. In one example, a remote data cache is included in each cluster and is accessible by the cache coherence controller of each cluster. The remote data cache acts to allow transactions to complete locally without probing local or remote nodes or sending the request to the home memory controller.

FIG. 1A is a diagrammatic representation of one example of a multiple cluster, multiple processor system that can use the techniques of the present invention. Each processing cluster 101, 103, 105, and 107 can include a plurality of processors. The processing clusters 101, 103, 105, and 107 are connected to each other through point-to-point links 111*a–f*. In one embodiment, the multiple processors in the multiple cluster architecture shown in FIG. 1A share the same memory space. In this example, the point-to-point links 111*a–f* are internal system connections that are used in place of a traditional front-side bus to connect the multiple processors in the multiple clusters 101, 103, 105, and 107. The point-to-point links may support any point-to-point coherence protocol.

Figure 1B:
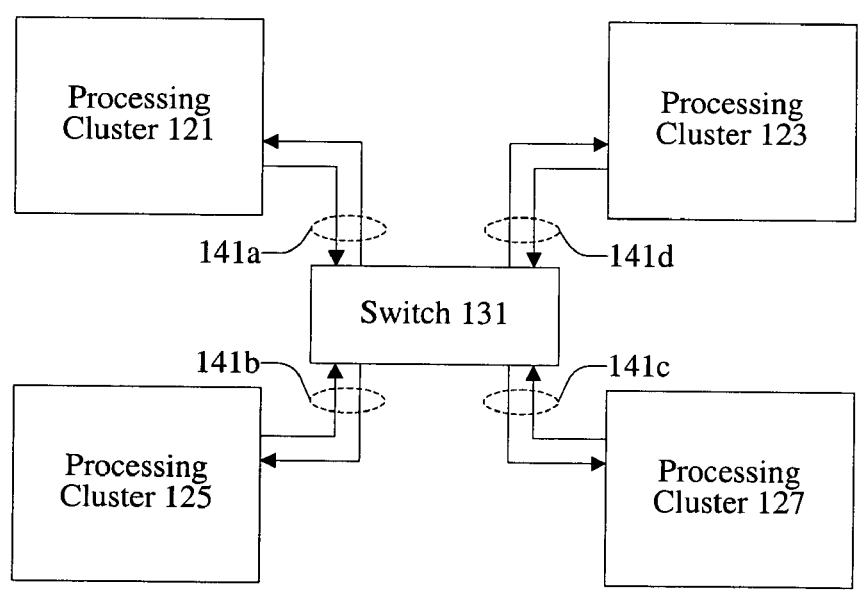

FIG. 1B is a diagrammatic representation of another example of a multiple cluster, multiple processor system that can use the techniques of the present invention. Each processing cluster 121, 123, 125, and 127 can be coupled to a switch 131 through point-to-point links 141*a–d*. It should be noted that using a switch and point-to-point links allows implementation with fewer point-to-point links when connecting multiple clusters in the system. A switch 131 can include a processor with a coherence protocol interface. According to various implementations, a multicluster system shown in FIG. 1A is expanded using a switch 131 as shown in FIG. 1B.

Figure 2:
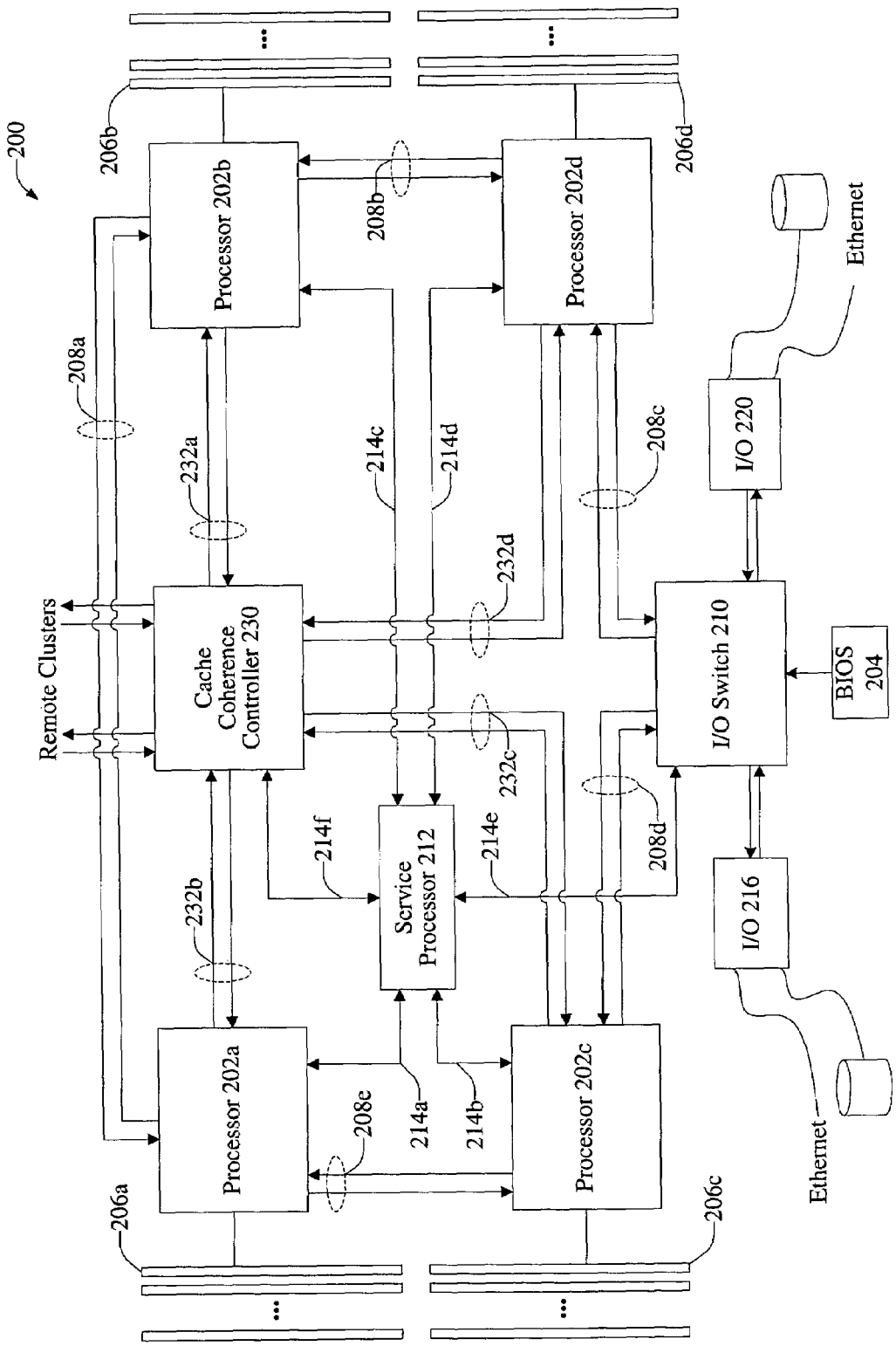
FIG. 2 is a diagrammatic representation of a cluster having a plurality of processors.

FIG. 2 is a diagrammatic representation of a multiple processor cluster, such as the cluster 101 shown in FIG. 1A. Cluster 200 includes processors 202*a*–202*d*, one or more Basic I/O systems (BIOS) 204, a memory subsystem comprising memory banks 206*a*–206*d*, point-to-point communication links 208*a*–208*e*, and a service processor 212. The point-to-point communication links are configured to allow interconnections between processors 202*a*–202*d*, I/O switch 210, and cache coherence controller 230. The service processor 212 is configured to allow communications with processors 202*a*–202*d*, I/O switch 210, and cache coherence controller 230 via a JTAG interface represented in FIG. 2 by links 214*a*–214*f*. It should be noted that other interfaces are supported. It should also be noted that in some implementations, a service processor is not included in multiple processor clusters. I/O switch 210 connects the rest of the system to I/O adapters 216 and 220.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables are used to control and isolate various system resources, the connections between which are defined therein.

The processors 202*a–d* are also coupled to a cache coherence controller 230 through point-to-point links 232*a–d*. Any mechanism or apparatus that can be used to provide communication between multiple processor clusters while maintaining cache coherence is referred to herein as a cache coherence controller. The cache coherence controller 230 can be coupled to cache coherence controllers associated with other multiprocessor clusters. It should be noted that there can be more than one cache coherence controller in one cluster. The cache coherence controller 230 communicates with both processors 202*a–d* as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of server 200 will be assumed. For example, most of the resources shown in FIG. 2 are assumed to reside on a single electronic assembly. In addition, memory banks 206*a*–206*d* may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet.

According to a specific embodiment and as shown in FIG. 2, both of I/O adapters 216 and 220 provide symmetric I/O access. That is, each provides access to equivalent sets of I/O. As will be understood, such a configuration would facilitate a partitioning scheme in which multiple partitions have access to the same types of I/O. However, it should also be understood that embodiments are envisioned in which partitions without I/O are created. For example, a partition including one or more processors and associated memory resources, i.e., a memory complex, could be created for the purpose of testing the memory complex.

According to one embodiment, service processor 212 is a Motorola MPC855T microprocessor which includes integrated chipset functions. The cache coherence controller 230 is an Application Specific Integrated Circuit (ASIC) supporting the local point-to-point coherence protocol. The cache coherence controller 230 can also be configured to handle a non-coherent protocol to allow communication with I/O devices. In one embodiment, the cache coherence controller 230 is a specially configured programmable chip such as a programmable logic device or a field programmable gate array.

Figure 3:
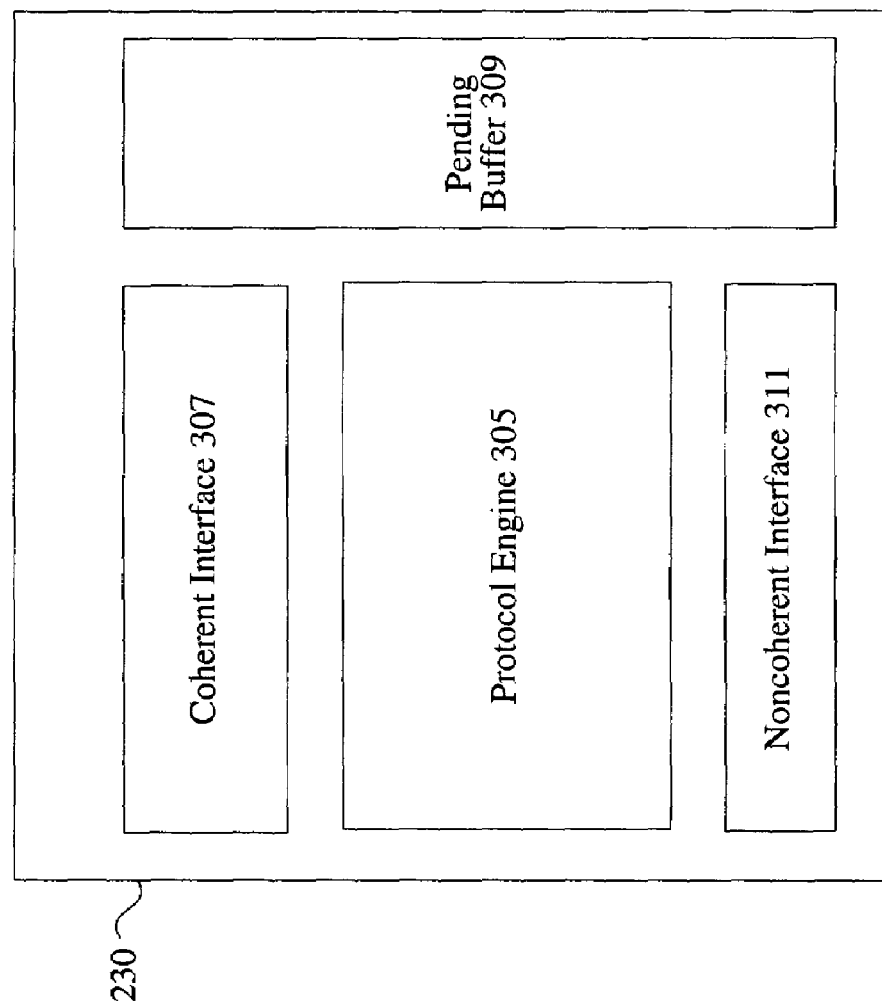
FIG. 3 is a diagrammatic representation of a cache coherence controller.

FIG. 3 is a diagrammatic representation of one example of a cache coherence controller 230. According to various embodiments, the cache coherence controller includes a protocol engine 305 configured to handle packets such as probes and requests received from processors in various clusters of a multiprocessor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the cache coherence controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information.

The cache coherence controller has an interface such as a coherent protocol interface 307 that allows the cache coherence controller to communicate with other processors in the cluster as well as external processor clusters. According to various embodiments, each interface 307 and 311 is implemented either as a full crossbar or as separate receive and transmit units using components such as multiplexers and buffers. The cache coherence controller can also include other interfaces such as a non-coherent protocol interface 311 for communicating with I/O devices. It should be noted, however, that the cache coherence controller 230 does not necessarily need to provide both coherent and non-coherent interfaces. It should also be noted that a cache coherence controller in one cluster can communicate with a cache coherence controller in another cluster.

Figure 4:
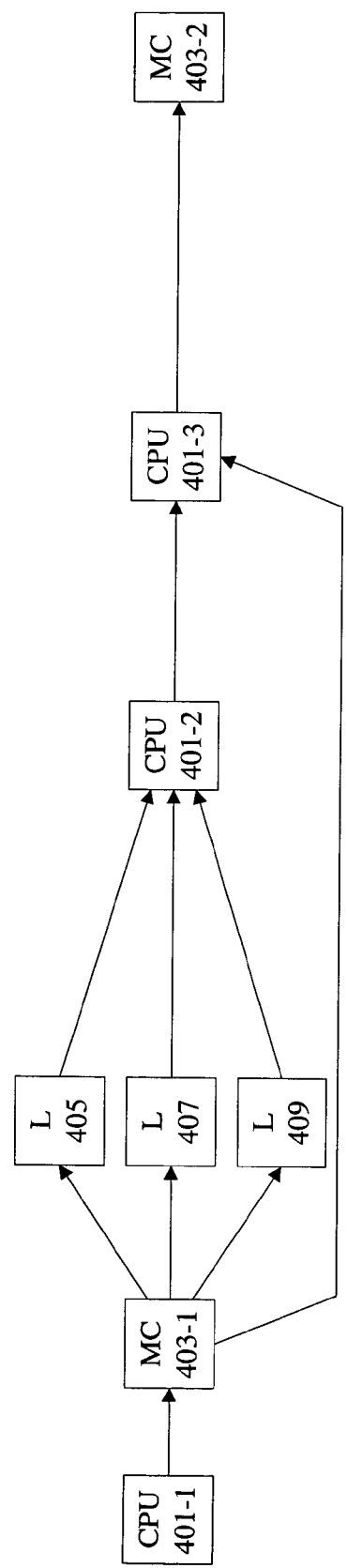
FIG. 4 is a diagrammatic representation showing a transaction flow for a data access request from a processor in a single cluster.

FIG. 4 is a diagrammatic representation showing the transactions for a cache request from a processor in a system having a single cluster without using a cache coherence controller. A processor 401-1 sends an access request such as a read memory line request to a memory controller 403-1. The memory controller 403-1 may be associated with this processor, another processor in the single cluster or may be a separate component such as an ASIC or specially configured Programmable Logic Device (PLD). To simplify cache coherence, only one processor is typically allowed to access a memory line corresponding to a shared address space at anyone given time. To prevent other processors from attempting to access the same memory line, the memory line can be locked by the memory controller 403-1. All other requests to the same memory line are blocked or queued. Access by another processor is typically only allowed when the memory controller 403-1 unlocks the memory line.

The memory controller 403-1 then sends probes to the local cache memories 405, 407, and 409 to determine cache states. The local cache memories 405, 407, and 409 then in turn send probe responses to the same processor 401-2. The memory controller 403-1 also sends an access response such as a read response to the same processor 401-3. The processor 401-3 can then send a done response to the memory controller 403-2 to allow the memory controller 403-2 to unlock the memory line for subsequent requests. It should be noted that CPU 401-1, CPU 401-2, and CPU 401-3 refer to the same processor.

FIGS. 5A–5D are diagrammatic representations depicting cache coherence controller operation. The use of a cache coherence controller in multiprocessor clusters allows the creation of a multiprocessor, multicluster coherent domain without affecting the functionality of local nodes such as processors and memory controllers in each cluster. In some instances, processors may only support a protocol that allows for a limited number of processors in a single cluster without allowing for multiple clusters. The cache coherence controller can be used to allow multiple clusters by making local processors believe that the non-local nodes are merely a single local node embodied in the cache coherence controller. In one example, the processors in a cluster do not need to be aware of processors in other clusters. Instead, the processors in the cluster communicate with the cache coherence controller as though the cache coherence controller were representing all non-local nodes.

It should be noted that nodes in a remote cluster will be referred to herein as non-local nodes or as remotes nodes. However, non-local nodes refer to nodes not in a request cluster generally and includes nodes in both a remote cluster and nodes in a home cluster. A cluster from which a data access or cache access request originates is referred to herein as a request cluster. A cluster containing a serialization point is referred to herein as a home cluster. Other clusters are referred to as remote clusters. The home cluster and the remote cluster are also referred to herein as non-local clusters.

Figure 5A:
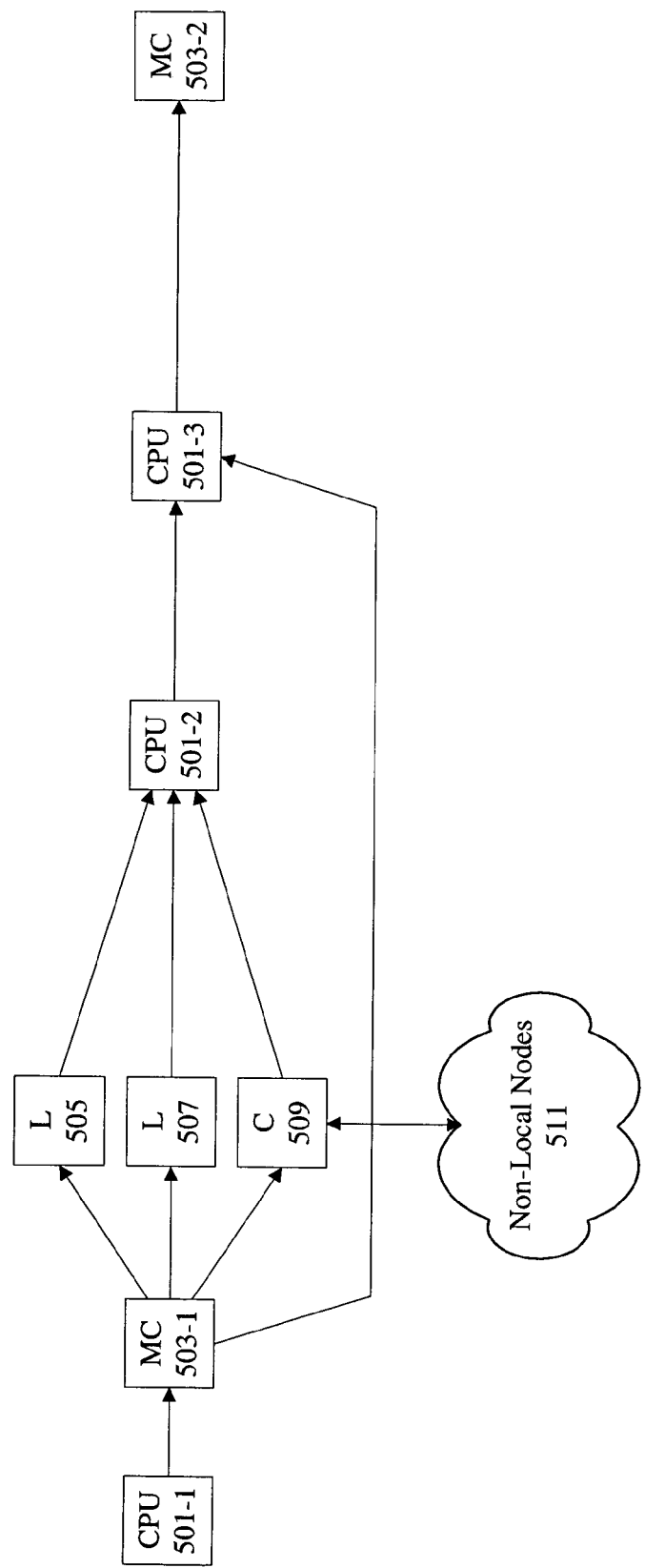
FIG. 5A–5D are diagrammatic representations showing cache coherence controller functionality.

FIG. 5A shows the cache coherence controller acting as an aggregate remote cache. When a processor 501-1 generates a data access request to a local memory controller 503-1, the cache coherence controller 509 accepts the probe from the local memory controller 503-1 and forwards it to non-local node portion 511. It should be noted that a coherence protocol can contain several types of messages. In one example, a coherence protocol includes four types of messages; data or cache access requests, probes, responses or probe responses, and data packets. Data or cache access requests usually target the home node memory controller. Probes are used to query each cache in the system. The probe packet can carry information that allows the caches to properly transition the cache state for a specified line. Responses are used to carry probe response information and to allow nodes to inform other nodes of the state of a given transaction. Data packets carry request data for both write requests and read responses.

According to various embodiments, the memory address resides at the local memory controller. As noted above, nodes including processors and cache coherence controllers outside of a local cluster are referred to herein as non-local nodes. The cache coherence controller 509 then accumulates the response from the non-local nodes and sends a single response in the same manner that local nodes associated with cache blocks 505 and 507 send a single response to processor 501-2. Local processors may expect a single probe response for every local node probed. The use of a cache coherence controller allows the local processors to operate without concern as to whether non-local nodes exist.

It should also be noted that components such as processor 501-1 and processor 501-2 refer herein to the same component at different points in time during a transaction sequence. For example, processor 501-1 can initiate a data access request and the same processor 501-2 can later receive probe responses resulting from the request.

Figure 5B:
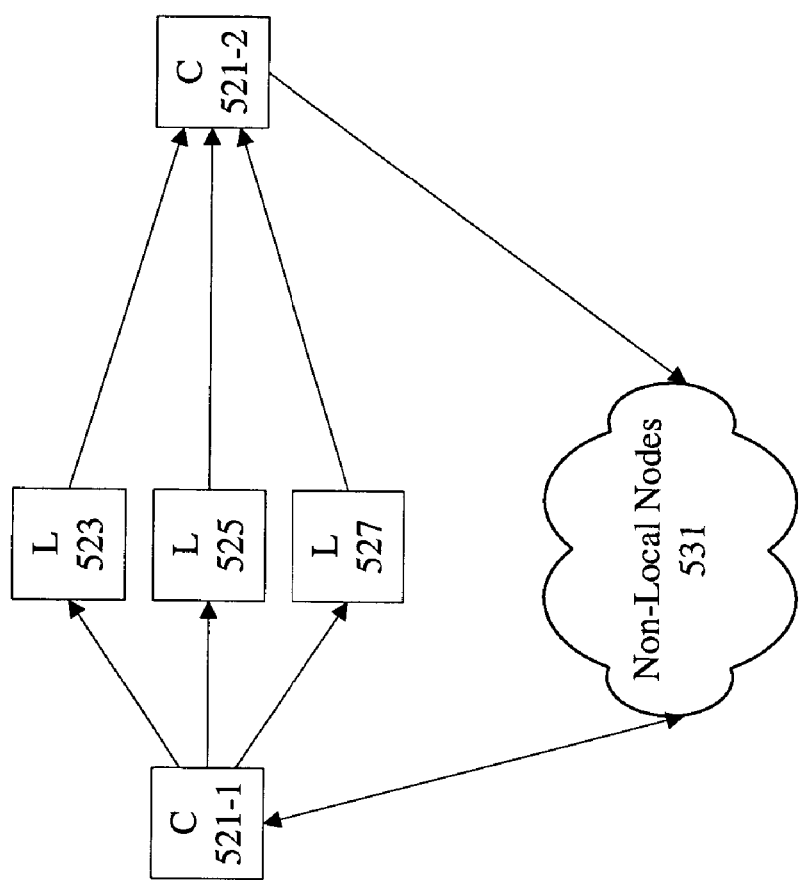

FIG. 5B shows the cache coherence controller acting as a probing agent pair. When the cache coherence controller 521-1 receives a probe from non-local nodes 531, the cache coherence controller 521-1 accepts the probe and forwards the probe to local nodes associated with cache blocks 523, 525, and 527. The cache coherence controller 521-2 then forwards a final response to the non-local node portion 531. In this example, the cache coherence controller is both the source and the destination of the probes. The local nodes associated with cache blocks 523, 525, and 527 behave as if the cache coherence controller were a local processor with a local memory request.

Figure 5C:
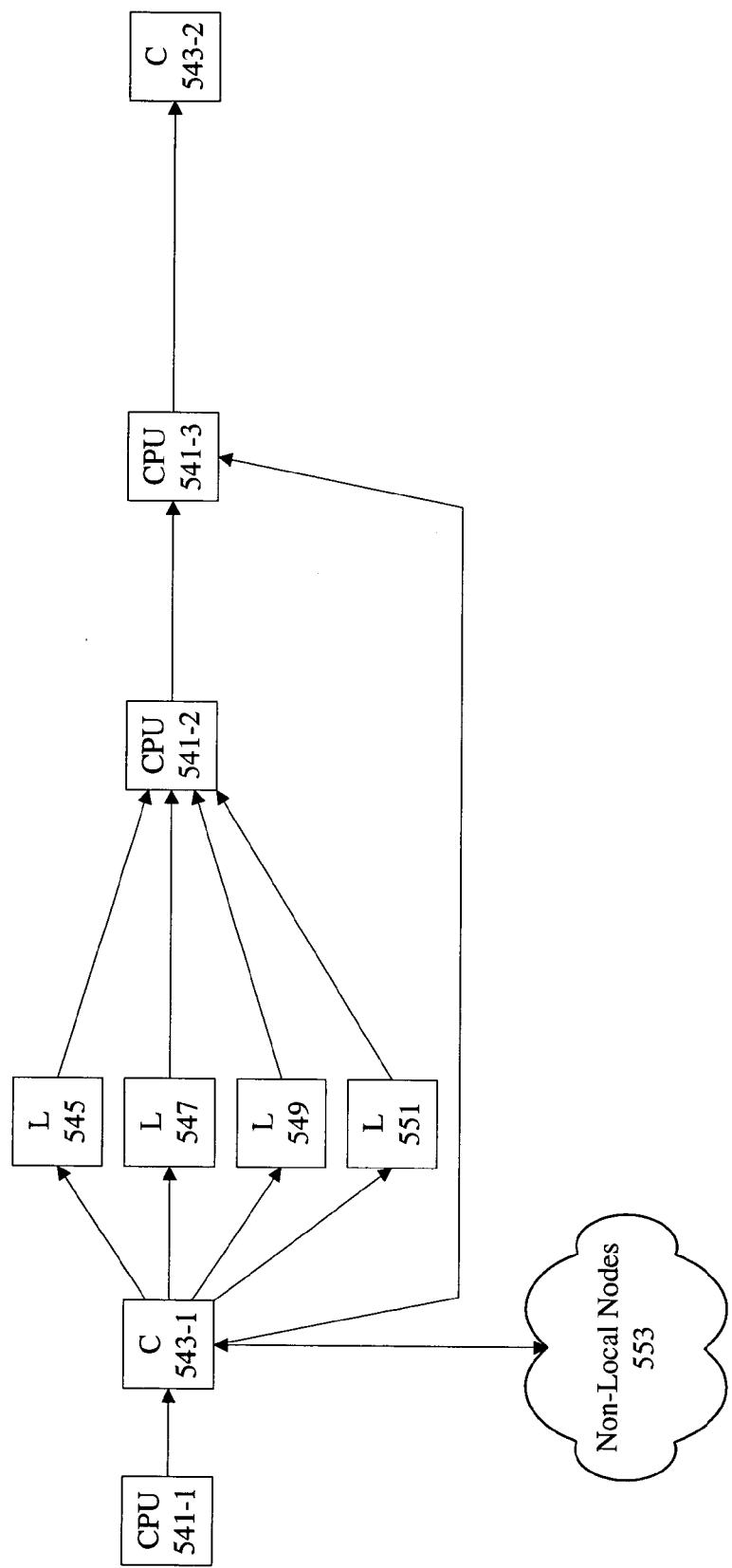

FIG. 5C shows the cache coherence controller acting as a remote memory. When a local processor 541-1 generates an access request that targets remote memory, the cache coherence controller 543-1 forwards the request to the non-local nodes 553. When the remote request specifies local probing, the cache coherence controller 543-1 generates probes to local nodes and the probed nodes provide responses to the processor 541-2. Once the cache coherence controller 543-1 has received data from the non-local node portion 553, it forwards a read response to the processor 541-3. The cache coherence controller also forwards the final response to the remote memory controller associated with non-local nodes 553.

Figure 5D:
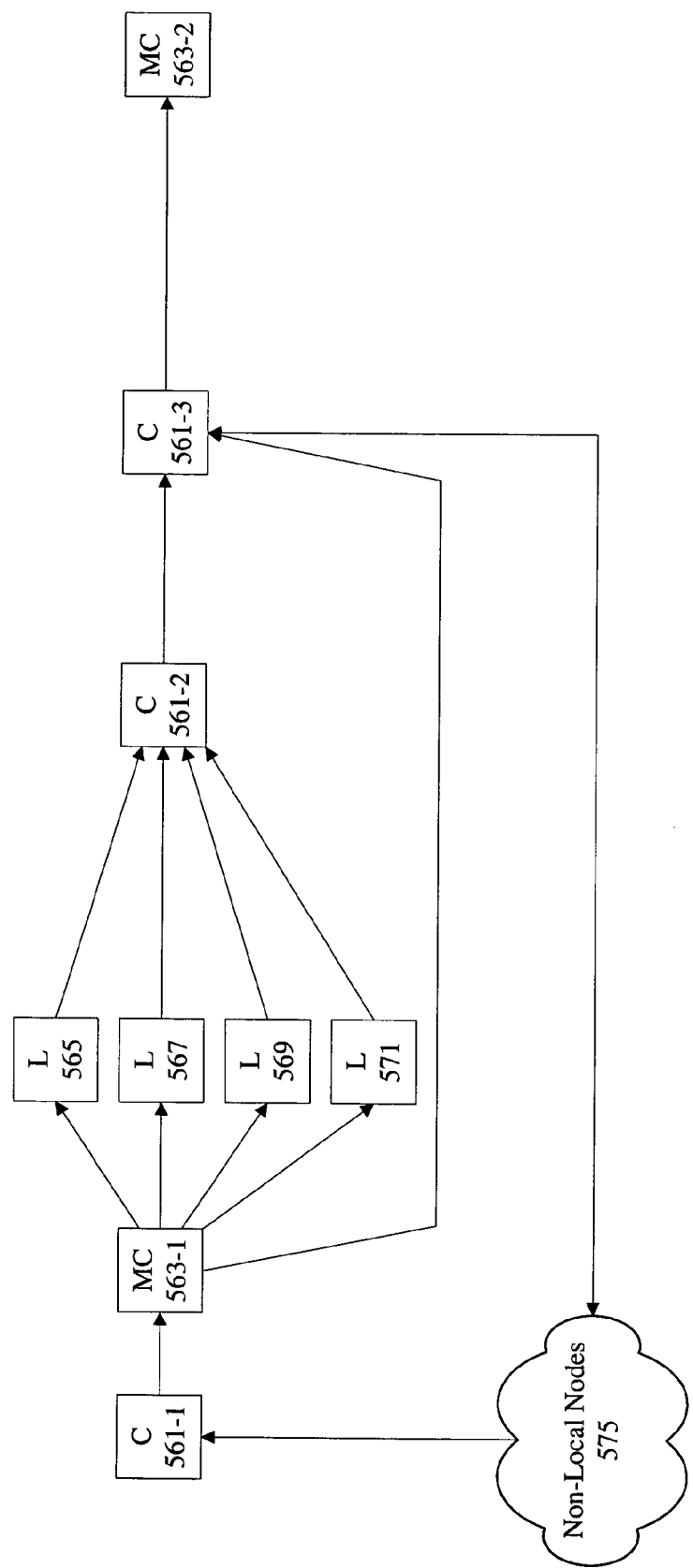

FIG. 5D shows the cache coherence controller acting as a remote processor. When the cache coherence controller 561-1 at a first cluster receives a request from a processor in a second cluster, the cache coherence controller acts as a first cluster processor on behalf of the second cluster processor. The cache coherence controller 561-1 accepts the request from portion 575 and forwards it to a memory controller 563-1. The cache coherence controller 561-2 then accumulates all probe responses as well as the data fetched and forwards the final response to the memory controller 563-2 as well as to non-local nodes 575.

By allowing the cache coherence controller to act as an aggregate remote cache, probing agent pair, remote memory, and remote processor, multiple cluster systems can be built using processors that may not necessarily support multiple clusters. The cache coherence controller can be used to represent non-local nodes in local transactions so that local nodes do not need to be aware of the existence of nodes outside of the local cluster.

Figure 6:
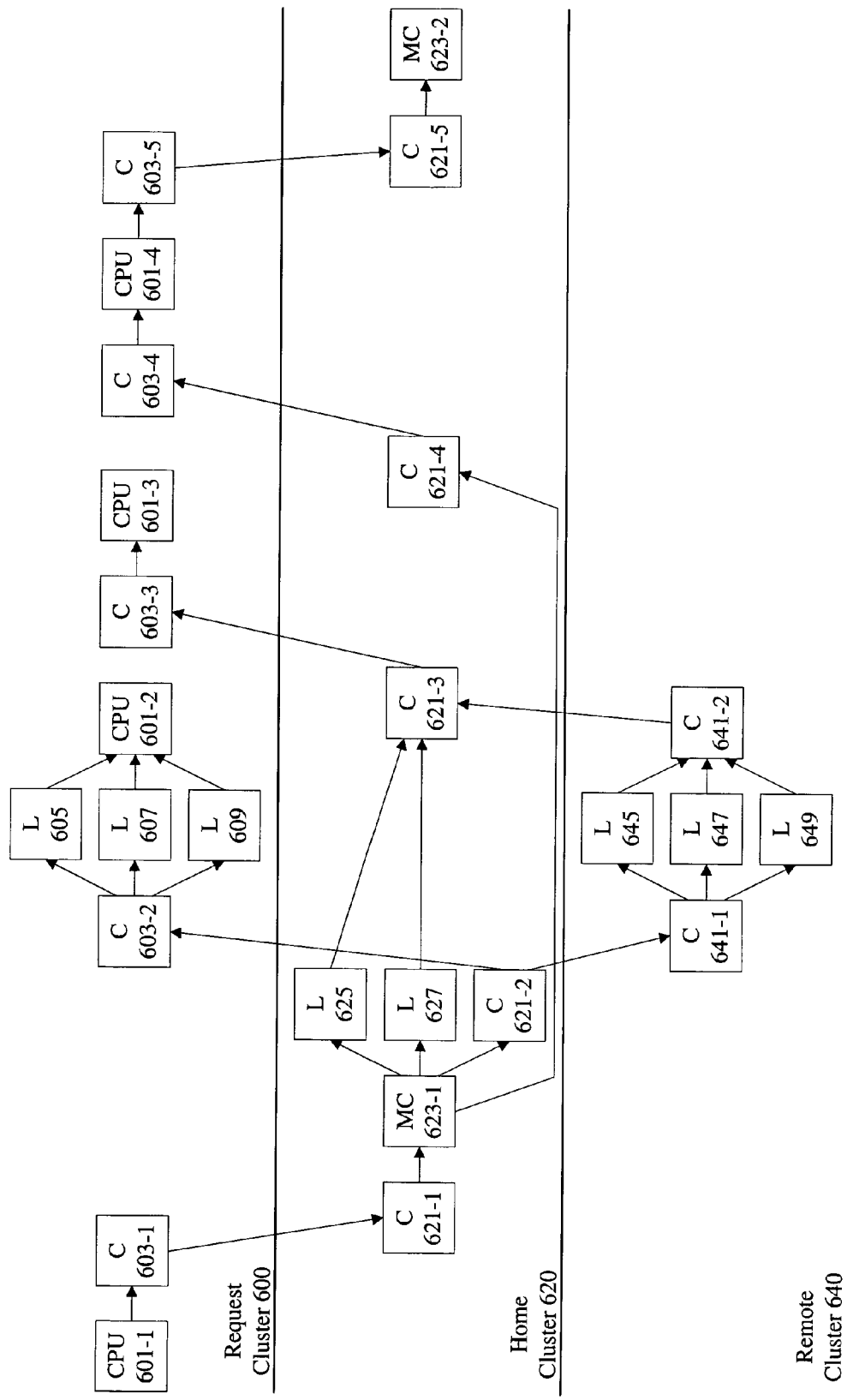
FIG. 6 is a diagrammatic representation depicting a transaction flow for a probe request with multiple probe responses.

FIG. 6 is a diagrammatic representation depicting the transactions for a data request from a local processor sent to a non-local cluster using a cache coherence controller. The multicluster system includes a request cluster 600, a home cluster 620, and a remote cluster 640. As noted above, the home cluster 620 and the remote cluster 640 as well as any other clusters excluding the request cluster 600 are referred to herein as non-local clusters. Processors and cache coherence controllers associated with local and non-local clusters are similarly referred to herein as local processors, local cache coherence controllers, non-local processors, and non-local cache coherence controllers, respectively.

According to various embodiments, processor 601-1 in a local cluster 600 sends a data access request such as a read request to a cache coherence controller 603-1. The cache coherence controller 603-1 tracks the transaction in the pending buffer of FIG. 3 and forwards the request to a cache coherence controller 621-1 in a home cluster 620. The cache coherence controller 621-1 at the home cluster 620 receives the access request and tracks the request in its pending buffer. In one example, information associated with the requests are stored in the pending buffer. The cache coherence controller 621-1 forwards the access request to a memory controller 623-1 also associated with the home cluster 620. At this point, the memory controller 623-1 locks the memory line associated with the request. In one example, the memory line is a unique address in the memory space shared by the multiple processors in the request cluster 600, home cluster 620, and the remote cluster 640. The memory controller 623-1 generates a probe associated with the data access request and forwards the probe to local nodes associated with cache blocks 625 and 627 as well as to cache coherence controller 621-2.

It should be noted that although messages associated with requests, probes, responses, and data are described as forwarded from one node to another, the messages themselves may contain variations. In one example, alterations are made to the messages to allow the multiple cluster architecture to be transparent to various local nodes. It should be noted that write requests can be handled as well. In write requests, the targeted memory controller gathers responses and sends the responses to the processor when gathering is complete.

The cache coherence controller 641-1 associated with the remote cluster 640 receives a probe from cache coherence controller 621-2 and probes local nodes associated with cache blocks 645, 647, and 649. Similarly, the cache coherence controller 603-2 associated with the request cluster 600 receives a probe and forwards the probe to local nodes associated with cache blocks 605, 607, and 609 to probe the cache blocks in the request cluster 600. Processor 601-2 receives probe responses from the local nodes associated with cache blocks 605, 607, and 609.

According to various embodiments, cache coherence controller 621-3 accumulates probe responses and sends the probe responses to cache coherence controller 603-3, which in turn forwards the probe responses to the processor 601-3. Cache coherence controller 621-4 also sends a read response to cache coherence controller 603-4, which forwards the read response to processor 601-4. While probes and probe responses carry information for maintaining cache coherency in the system, read responses can carry actual fetched data. After receiving the fetched data, processor 601-4 may send a source done response to cache coherence controller 603-5. According to various embodiments, the transaction is now complete at the requesting cluster 600. Cache coherence controller 603-5 forwards the source done message to cache coherence controller 621-5. Cache coherence controller 621-5 in turn sends a source done message to memory controller 623-2. Upon receiving the source done message, the memory controller 623-2 can unlock the memory line and the transaction at the home cluster 620 is now complete. Another processor can now access the unlocked memory line.

It should be noted that because the cache coherence controller 621-3 waits for remote cluster probe responses before sending a probe response to cache coherence controller 603-3, delay is introduced into the system. According to various embodiments, probe responses are gathered at cache coherence controller 603-3. By having remote clusters send probe responses through a home cluster, both home cluster probe responses and remote cluster probe responses can be delayed at the home cache coherence controller. In one example, remote cluster probe responses have to travel an additional hop in order to reach a request cluster. The latency for transmission of a probe response between a remote cluster and a request cluster may be substantially less than the latency for transmission of a probe response between a remote cluster and a request cluster through a home cluster. Home cluster probe responses are also delayed as a result of this added hop.

As will be appreciated by one of skill in the art, the specific transaction sequences involving requests, probes, and response messages can vary depending on the specific implementation. In one example, a cache coherence controller 621-3 may wait to receive a read response message from a memory controller 623-1 before transmitting both a probe response message and a read response message to a cache coherence controller 603-3. In other examples, a cache coherence controller may be the actual processor generating the request. Some processors may operate as both a processor and as a cache coherence controller. Furthermore, various data access request messages, probes, and responses associated with reads and writes are contemplated. As noted above, any message for snooping a cache can be referred to as a probe. Similarly, any message for indicating to the memory controller that a memory line should be unlocked can be referred to as a source done message.

It should be noted that the transactions shown in FIG. 6 show examples of cache coherence controllers performing many different functions, including functions of remote processors, aggregate local caches, probing agent pairs, and remote memory as described with reference to FIGS. 5A–5D.

The cache coherence controller 621-1 at the home cluster 620 is acting as a remote processor. When the cache coherence controller receives a request from a request cluster processor, the cache coherence controller is directed to act as the requesting processor on behalf of the request cluster processor. In this case, the cache coherence controller 621-1 accepts a forwarded request from processor 601-1 and sends it to the memory controller 623-1, accumulates responses from all local nodes and the memory controller 623-1, and forwards the accumulated responses and data back to the requesting processor 601-3. The cache coherence controller 621-5 also forwards a source done to the local memory controller 623-2.

The cache coherence controller 603-1 at the request cluster 600 is acting as a remote memory. As remote memory, the cache coherence controller is designed to forward a request from a processor to a proper remote cluster and ensure that local nodes are probed. In this case, the cache coherence controller 603-1 forwards a probe to cache coherence controller 621-1 at a home cluster 620. Cache coherence controller 603-2 also probes local nodes 605, 607, and 609.

The cache coherence controller 641-1 at the request cluster 640 is acting as a probing agent pair. As noted above, when a cache coherence controller acting as a probing agent pair receives a probe from a remote cluster, the cache coherence controller accepts the probe and forwards it to all local nodes. The cache coherence controller accumulates the responses and sends a final response back to the request cluster. Here, the cache coherence controller 641-1 sends a probe to local nodes associated with cache blocks 645, 647, and 649, gathers probe responses and sends the probe responses to cache coherence controller 621-3 at home cluster 620. Similarly, cache coherence controller 603-2 also acts as a probing agent pair at a request cluster 600. The cache coherence controller 603-2 forwards probe requests to local nodes including local nodes associated with cache blocks 605, 607, and 609.

The cache coherence controller 621-2 and 621-3 is also acting as an aggregate remote cache. The cache coherence controller 621-2 is responsible for accepting the probe from the memory controller 623-1 and forwarding the probe to the other processor clusters 600 and 640. More specifically, the cache coherence controller 621-2 forwards the probe to cache coherence controller 603-2 corresponding to request cluster 600 and to cache coherence controller 641-1 corresponding to remote cluster 640. As noted above, using a multiple cluster architecture may introduce delay as well as other undesirable elements such as increased traffic and processing overhead.

Probes are transmitted to all clusters in the multiple cluster system even though not all clusters need to be probed. For example, if a memory line associated with a probe request is invalid or absent from cache, it may not be necessary to probe all of the caches associated with the various clusters. In a system without a coherence directory, it is typically necessary to snoop all clusters. However, by using a coherence directory, the number of transactions in the system can be reduced by probing only a subset of the clusters in a system in order to minimize traffic and processing overhead.

By using a coherence directory, global memory line state information (with respect to each cluster) can be maintained and accessed by a memory controller or a cache coherence controller in a particular cluster. According to various embodiments, the coherence directory tracks and manages the distribution of probes as well as the receipt of responses. If coherence directory information indicates that probing of a specific cluster is not required, the probe to the specific cluster can be eliminated. In one example, a coherence directory indicates that probing of requesting and remote clusters is not necessary. A cache coherence controller in a home cluster probes local nodes without forwarding probes to the request and remote clusters. The cache coherence controller in the home cluster then sends a response to the request cluster after probe responses are received. However, in typical multiple cluster systems, a requesting cluster expects a predetermined number of responses from the various probed clusters. In one example, if the multiple cluster system includes four clusters, a request cluster would expect probe responses associated with nodes in all four clusters.

FIG. 7 is one example of a coherence directory that can be used to allow management and filtering of probes. Various coherence directories are available. In one example, a full directory provides an entry for every memory line in a system. In this example, the coherence directory is maintained at the memory controller and is accessible by a cache coherence controller. However, in a system with a large amount of system memory, a full directory may not be efficient or practical. According to various embodiments, a sparse directory is provided with a limited number of entries associated with a selected set of memory lines. In one example, the coherence directory 701 includes state information 713, dirty data owner information 715, and an occupancy vector 717 associated with the memory lines 711. In some embodiments, the memory line states are modified, owned, shared, and invalid.

In the invalid state, a memory line is not currently cached in cache associated with any remote cluster. In the shared state, a memory line may be present in more than one cache, but the memory line is clean and can not be modified in any of these caches. When a memory line is in the shared state, an occupancy vector 717 can be checked to determine what caches share the relevant data. An occupancy vector 717 may be implemented as an N-bit string, where each bit represents the availability of the data in the cache of N clusters. Any mechanism for tracking what clusters hold a copy of the relevant memory line in cache is referred to herein as an occupancy vector. The memory line with address 741 is in the shared state, and the occupancy vector 717 indicates that clusters 1 and 3 each have a copy of the shared memory line in cache.

In the modified state, a memory line has been modified and the modified copy exists in cache associated with a particular cluster. When a memory line is modified, dirty data owner information field 715 can be checked to determine the owner of the dirty data. Any mechanism for indicating what cluster owns a modified copy of the memory line in cache is referred to herein as a dirty data owner information field. In one example, the memory line associated with address 781 is modified, and the dirty data owner field 715 indicates that cluster 2 owns the memory line.

In the owned state, a dirty memory line is owned by a single cache but may be held shared in multiple other caches. It has been modified by the owning cache, but is now read-only. In this case, the copy held in memory is stale. If the memory line is in the owned state, dirty data owner field 715 can be accessed to determine which cluster owns the dirty data. In one example, the memory line associated with address 761 is in the owned state and is owned by cluster 4. The occupancy vector 717 can also be checked to determine what other caches may have the relevant data. In this example, the occupancy vector 717 indicates that clusters 2, 3, and 4 each have a copy of the data associated with the memory line in cache.

Although the coherence directory 701 includes the four states of modified, owned, shared, and invalid, it should be noted that particular implementations may use a different set of states. In one example, a system may have the five states of modified, exclusive, owned, shared, and invalid. In the exclusive state, a memory line may be accessible to a particular node in a remote cluster, but the node in the remote cluster has not yet written data to the cache line. The techniques of the present invention can be used with a variety of different possible memory line states.

When a processor in a request cluster performs a transaction such as a read request on a particular memory line, the processor accesses an associated cache. In many implementations, each processor in a particular cluster has an associated cache. If the memory line is not available in cache, the request is forwarded to a home cluster through a cache coherence controller. In one embodiment, the home cluster is the cluster of processors having the address space including the memory line of the request. The cache coherence controller can then access the coherence directory to determine what clusters should be probed to meet the request. The coherence directory allows a reduction of the number of probes transmitted between clusters.

Mechanisms for reducing the number of transactions in a system by accessing a coherence directory are described in U.S. patent application Ser. Nos. 10/288,399 and 10/288,347 by David B. Glasco, both titled Methods and Apparatus for Managing Probe Requests on the filing date Nov. 4, 2002, the entireties of which are incorporated by reference for all purposes. By reducing the number of inter cluster transactions, system efficiencies are improved as bandwidth is preserved and transaction latency is reduced. The coherence directory provides one mechanism for reducing intercluster transactions. According to various embodiments, a remote data cache is another mechanism for reducing intercluster transactions.

According to various embodiments, another level of caching is provided in each cluster so that if the cache associated with each processor does not hold a requested memory line, the cache associated with the cluster may be checked before forwarding a probe to a home cluster. In one example, a remote data cache is included in each cluster and accessible by the cache coherence controller of each cluster. Unlike the caches associated with each processor, in this example a single remote data cache is provided for multiple processors in a cluster. If a memory line requested by a particular processor is not found in the cache associated with the processor, a cache coherence controller does not necessarily need to forward the request to a home cluster. Instead the cache coherence controller can check the remote data cache to determine if the memory line is resident in the remote data cache. If the memory line is resident in the remote data cache, no request needs to be forwarded to the home cluster and the cache coherence controller can instead use the data in the remote data cache to respond to the transaction.

By using the techniques of the present invention, the remote data cache can respond to requests such as read block, read block shared, and read block modified without forwarding the request to a home cluster. Consequently, a transaction can be completed without probing local or remote nodes.

FIG. 8 is a diagrammatic representation of a remote data cache. The remote data cache allows a cache coherence controller to efficiently handle certain types of transactions locally without having to forward probes to remote clusters. Any cache holding data from remote clusters accessed by local processors that is accessed after local caches but before a home cluster memory controller is referred to herein as a remote data cache. In one example, a remote data cache is accessed by a cache coherence controller before a request such as a read, read block shared, or read block modified request is forwarded to a home cluster. A remote data cache allows a transaction to be handled in a local cluster without having to forward probes to remote clusters.

According to various embodiments, a remote data cache 801 includes a memory line field 811. The addresses of various memory lines are provided in this field to allow efficient access by a cache coherence controller to determine if a particular memory line is resident in the remote data cache. Entries are typically added to the remote data cache when memory lines are evicted from processor cache or fetched from the home memory controller by requests that miss in the remote data cache. The remote data cache 801 also includes state information 813 and the actual cached data 815. In one example, address 821 has a state of invalid and no associated cache data. It should be noted that in typical instances, a memory line in the invalid state would simply not be included in the remote data cache. Address 841 includes data 843 held in the shared state. In one example, data held in the shared state in the remote data cache can be used to satisfy read block and read block shared requests without forwarding the request to the home cluster. Address 861 has data 863 held in the owned state. According to various embodiments, data held in the owned state can also be used to satisfy read block and read block shared transactions.

It should be noted that in some instances, no data can be held in the remote data cache 801 in the modified state. For systems with remote data caching, the remote data cache can be used to cache data from remote clusters. In such systems, the standard MEOSI cache coherence protocol is typically employed. In such a protocol, the local processor caches may evict a memory line from the cache and if the line is dirty (modified or owned state), the data is written back to memory. The remote data cache, which sits between the processor cache and system memory, will observe the write back, but does not have enough information to determine how to install the line into the remote data cache. A typical processor cache does have this information.

However, the remote data cache is associated with a cache coherence controller. In some instances, the cache coherence controller does not have information about whether a line being evicted from a processor cache was in a modified or owned state. The remote data cache consequently takes a conservative approach and installs the memory line in an owned state even though the memory line maybe could have been installed in a modified state. In the same manner, the remote data cache sometimes conservatively installs a memory line in a shared state even though the memory line maybe could have been installed in an exclusive state. By taking the conservative approach, transactions such as read block modified that could be handled if the memory line were known to be in an exclusive or modified state, can not be handled by the remote data cache and consequently are forwarded to the home cluster. Forwarding to the home cluster uses system resources that do not necessarily have to be used.

Several mechanisms for allowing a remote data cache to install memory lines not only in the shared and owned states, but also in the exclusive and modified states. In one example, the modified or owned state information used to install a memory line into the remote data cache is obtained from a coherence directory. In another example, the state information is obtained from an augmented source done message from a processor.

These mechanisms allow all data in the remote data cache to be held not only in the shared or owned states, but also in the modified and exclusive states. Data in the remote data cache held in the modified or exclusive states can satisfy read block, read block shared, and read block modified transactions. Other mechanisms for populating a remote data cache are described in filed U.S. patent application Ser. No. 10/442,845, titled Methods And Apparatus For Providing Cache State Information by David B. Glasco, filed on May 20, 2003, the entirety of which is incorporated by reference herein for all purposes.

It should be noted that the remote data cache 801 also holds information in the pending state. The pending state is used to hold data that is initially entered into the remote data cache but not yet confirmed by a source done. Data held in the pending state may be invalidated by a probe received by the processor after the data is initially written to the remote data cache but before the final response transaction is received.

FIG. 9 is a diagrammatic representation showing a transaction flow depicting how a remote data cache is used. According to various embodiments, a processor 901-1 in a request cluster 900 sends a data access request such as a read request to a cache coherence controller 903-1. The cache coherence controller 903-1 tracks the transaction in the pending buffer and determines whether the request can be handled locally using remote data cache 905. According to various embodiments, if the request is a read block or read block shared for a particular memory line, the request can be handled locally if the memory line is held in the remote data cache in any of the modified, owned, exclusive, or shared states. In other words, the request can be handled locally if a valid copy of the memory line is in the remote data cache. If the request is a transaction such as read block modified, the request can be handled locally if the memory line is held in the remote data cache in the modified or exclusive state. If the request can be handled locally, the remote data cache provides information to the cache coherence controller 903-3.

In typical implementations, the requesting processing node expects responses from other processing nodes before the transaction can complete. If a transaction is satisfied locally by a remote data cache, other processing nodes would not have to be probed in an optimal case and consequently would not generate responses. In a scenario where a transaction can be satisfied locally by a remote data cache, the cache coherence controller would have to either generate a probe to other nodes in the system, which would result in responses from probed nodes back to the requesting node, or the cache coherence controller could generate responses on behalf of other nodes in the system. However, sending extraneous probes and probe responses decreases the benefits of having a remote data cache satisfy a transaction locally. The cache coherence controller has all of the information necessary to complete the transaction using the remote data cache and should be able to signal the requesting processor that the transaction is complete.

Consequently, the techniques of the present invention provide mechanisms for allowing a cache coherence controller with a remote data cache to satisfy a transaction locally without having to send extraneous probes or probe responses. In one embodiment, the techniques of the present invention provide that a cache coherence controller responds to a requesting processing node with response information as well as a completion indicator. Any mechanisms notifying a requesting processing node that no other responses should be expected is referred to herein as a completion indicator. In one example, the completion indicator is a completion bit provided with response information from a cache coherence controller. The response information can include state information as well as data from the remote data cache. According to various embodiments, the response information is provided to a requesting processor 901-3. The requesting processor 901-3 then sends a source done to the cache coherence controller 903-5 upon recognizing the completion bit. If a completion bit is not provided, the requesting processor 901-3 then typically expects responses from other nodes in the system. In one example, the requesting processor 901-3 expects response from nodes in the cluster of the requesting processor as well as a response from a home cluster cache coherence controller.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with multiple processor clusters connected through a point-to-point, switch, or bus architecture. In another example, multiple clusters of processors may share a single cache coherence controller, or multiple cache coherence controllers can be used in a single cluster. Therefore, the scope of the invention should be determined with reference to the appended claims.

What is claimed is:

1. A method for providing a response to a cache access request, the method comprising:
   receiving a cache access request associated with a memory line at a cache coherence controller from a processor in a cluster of processors, the cluster of processors interconnected in a point-to-point architecture;
   obtaining response information for the cache access request from a remote data cache associated with the cache coherence controller, wherein the remote data cache receives data and state information for memory lines of remote clusters, each remote cluster including a plurality of remote cluster processors;
   determining that the cache access request can be handled locally by using the remote data cache without having to probe remote nodes; and
   providing response information with a completion indicator to the processor when it is determined that the cache access request can be handled locally.

2. The method of claim 1, wherein the cache access request can be handled locally if a valid copy of the memory line is in the remote data cache.

3. The method of claim 1, wherein response information includes state information.

4. The method of claim 2, wherein the completion indicator is a completion bit.

5. The method of claim 1, wherein the completion indicator notifies the processor that the response information from the cache coherence controller will be the only response information.

6. The method of claim 1, wherein the processor is a request processor in a request cluster.

7. The method of claim 1, wherein the completion indicator allows the cache coherence controller to avoid probing local or remote nodes.

8. The method of claim 1, wherein the processor sends a source done upon identifying the completion indicator in the response information.

9. The method of claim 8, wherein the processor sends the source done to the cache coherence controller.

10. The method of claim 9, wherein the processor sends the source done to the cache coherence controller acting as a memory controller.

11. A processing cluster, comprising:
    a plurality of processors interconnected in a point-to-point architecture;
    a cache coherence controller configured to receive a cache access request associated with a memory line from a first processor amongst the plurality of processors, obtain response information for the cache access request from a remote data cache associated with the cache coherence controller and provide response information with a completion indicator to the processor if it is determined that a valid copy of the memory line is in the remote data cache, wherein the remote data cache receives data and state information for memory lines of remote clusters, each remote cluster including a plurality of remote cluster processors.

12. The processing cluster of claim 11, wherein response information is provided in a response packet.

13. The processing cluster of claim 11, wherein response information includes stale information.

14. The processing duster of claim 12, wherein response information includes data.

15. The processing cluster of claim 11, wherein the completion indicator notifies the first processor that the response information from the cache coherence controller will be the only response information.

16. The processing cluster of claim 11, wherein the first processor is a request processor in a request cluster.

17. The processing cluster of claim 11, wherein the completion indicator allows the cache coherence controller to avoid probing local or remote nodes.

18. The processing cluster of claim 11, wherein the first processor sends a source done upon identifying the completion indicator in the response information.

19. The processing cluster of claim 18, wherein the first processor sends the source done to the cache coherence controller.

20. A cache coherence controller, comprising:

means for receiving a cache access request associated with a memory line at a cache coherence controller from a processor in a cluster of processors, the cluster of processors interconnected in a point-to-point architecture;

means for obtaining response information for the cache access request from a remote data cache associated with the cache coherence controller, wherein the remote data cache receives data and state information for memory lines of remote clusters, each remote cluster including a plurality of remote cluster processors; and means for providing response information with a completion indicator to the processor after determining tat the cache access request can be completed locally.

* * * * *